(12) United States Patent
Pruett (10) Patent No.: US 10,446,942 B2
(45) Date of Patent: Oct. 15, 2019

(54) DUAL FREQUENCY ELECTRONICALLY SCANNED ARRAY AND RELATED TECHNIQUES

(71) Applicant: Raytheon Company, Waltham, MA (US)

(72) Inventor: James A. Pruett, Allen, TX (US)

(73) Assignee: Raytheon Company, Waltham, MA (US)

( * ) Notice: Subject to any disclaimer, the term of this patent is extended or adjusted under 35 U.S.C. 154(b) by 355 days.

(21) Appl. No.: 15/378,785

(22) Filed: Dec. 14, 2016

(65) Prior Publication Data

US 2018/0166795 A1 Jun. 14, 2018

(51) Int. Cl.
| | |
|---|---|
| *G01S 13/42* | (2006.01) |
| *H01Q 21/30* | (2006.01) |
| *H01Q 5/30* | (2015.01) |
| *H01Q 3/22* | (2006.01) |
| *G01S 13/02* | (2006.01) |

(52) U.S. Cl.
CPC .......... *H01Q 21/30* (2013.01); *G01S 13/426* (2013.01); *H01Q 3/22* (2013.01); *H01Q 5/30* (2015.01); *G01S 2013/0254* (2013.01)

(58) Field of Classification Search
CPC .......... G01S 13/426; G01S 2013/0254; H01Q 21/30; H01Q 25/002; H01Q 3/22; H01Q 5/30
USPC .......................................................... 342/81
See application file for complete search history.

(56) References Cited

U.S. PATENT DOCUMENTS

| | | | |
|---|---|---|---|
| 5,233,358 | A | 8/1993 | Murphy |
| 5,274,390 | A | 12/1993 | Breakall |
| 5,933,113 | A | 8/1999 | Newberg et al. |
| 6,583,760 | B2 | 6/2003 | Martek et al. |
| 6,795,020 | B2 | 9/2004 | Sreenivas et al. |

(Continued)

FOREIGN PATENT DOCUMENTS

| | | |
|---|---|---|
| CN | 106099342 | 11/2016 |
| WO | WO 2005/053097 | 6/2005 |
| WO | WO 2007/023371 | 3/2007 |

OTHER PUBLICATIONS

U.S. Appl. No. 15/378,797, filed Dec. 14, 2016, Pruett.

(Continued)

*Primary Examiner* — Timothy A Brainard
(74) *Attorney, Agent, or Firm* — Daly, Crowley, Mofford & Durkee LLP (57) ABSTRACT

Systems and methods described herein are directed towards a radar system and a dual frequency electronically scanned array (ESA) capable of transmitting and receiving radio frequency (RF) signals at least two frequencies. The ESA includes a plurality of antenna elements which form a first effective aperture at a first radio frequency (RF) frequency and operational over a first scan range and which form a second effective aperture at a second radio frequency (RF) frequency and operational over a second scan angle. The first and second scan ranges are complementary so as to provide the radar system having an overall scan range. The plurality of antenna elements are spaced apart from each other by an amount related to at least one of the first and second scan ranges and/or one or more operating frequencies of the radar system.

20 Claims, 6 Drawing Sheets

(56) References Cited

U.S. PATENT DOCUMENTS

| | | | |
|---|---|---|---|
| 7,696,945 B2 * | 4/2010 | Svensson | H01Q 21/005 |
| | | | 343/770 |
| 8,350,771 B1 | 1/2013 | Zaghloul et al. | |
| 10,121,030 B1 | 11/2018 | Fink et al. | |
| 10,320,087 B2 | 6/2019 | Miraftab et al. | |
| 2008/0291087 A1 * | 11/2008 | Tietjen | G01S 7/03 |
| | | | 342/372 |
| 2009/0079620 A1 * | 3/2009 | Van Caekenberghe | G01S 7/03 |
| | | | 342/200 |
| 2017/0179576 A1 | 6/2017 | Hartenstein | |
| 2018/0302802 A1 | 10/2018 | Fanfelle | |

OTHER PUBLICATIONS

U.S. Non-Final Office Action dated Jan. 25, 2019 for U.S. Appl. No. 15/378,797; 14 Pages.

PCT International Search Report and Written Opinion dated Apr. 5, 2018 for International Application No. PCT/US2017/064463; 16 pages.

PCT International Search Report and Written Opinion dated Mar. 16, 2018 for International Application No. PCT/US2017/064459; 17 Pages.

Bray, et al.; Thinned Aperiodic Linear Phased Array Optimization for Reduced Grating Lobes During Scanning with Input Impedance Bounds. IEEE Antennas and Propagation Society International Symposium. 2001 Digest. Held in conjunction with: USNC/URSI National Radio Science Meeting (Cat. No. 01CH37229),Boston, MA, USA, Jul. 8, 2001, vol. 3 p. 688-91 (4 pages).

Final Office Action dated Jul. 17, 2019 for U.S. Appl. No. 15/378,797; 12 pages.

\* cited by examiner

DUAL FREQUENCY ELECTRONICALLY SCANNED ARRAY AND RELATED TECHNIQUES

BACKGROUND

As is known in the art, there exists a class of phased array radar systems known as active electronically scanned array (AESA) radar systems. AESA radar systems transmit and receive radio frequency (RF) signals through a phased array antenna. Transmit and receive beams can be electronically formed and directed (or "pointed" or "steered" or "scanned") by appropriate phasing of selected ones of antenna elements which make up the phased array antenna.

An angle at which the AESA directs a main antenna beam is referred to as a beam scan angle (or more simply a "scan angle") and the entire angular range over which an AESA can scan the main beam is referred to as a scan angle range (or more simply "scan range").

The further a phased array radar scans a beam off the antenna boresight (i.e. the greater the scan angle), the beam begins to broaden, resulting in scan loss. Thus, when AESA radar systems scan at angles approaching or reaching the outer limits of a scan angle range (e.g. extreme angles off the AESA boresight), the AESA experiences so-called scan loss and other errors which can reduce the effectiveness of the radar system.

Thus, to increase a scan range over which an AESA radar system can operate, radar systems may increase a dwell time and/or increase an RF signal power provided to the AESA at the extreme scan positions. Alternatively, or in addition to the above, in some embodiments, the scan range of a radar system may be increased by increasing the number of antenna elements in the phased array and/or by utilizing multiple AESAs in the radar system. While increasing the number of antenna elements in an AESA and/or utilizing multiple AESAs increases a scan range of a radar system, such approaches also result in a concomitant (and sometimes prohibitive) increase in the size, weight, power, and cost of the AESA and the radar system.

SUMMARY

In accordance with the concepts sought to be protected herein, it has been recognized that a radar system having a single active electronically steered array (AESA) may be operated at a pair of frequencies selected such that the AESA radar system is provided having an overall (or total) scan range which is wider than scan ranges of conventional radar systems having a single AESA aperture. Such wide scan operation is achieved by simultaneously establishing a first boresight position at a first frequency and a second, different boresight position at a second, different frequency in a single AESA without the need to adjust amplitude or phase values of the AESA antenna elements. Thus, radar system creates faux planar aperture that is capable of scanning to extreme angles. The use of dual frequency to create a faux planar aperture that is capable of scanning to extreme angles results in an AESA radar system having an overall scan range which is greater than a scan range achievable with conventional AESA radar systems.

Also disclosed is a technique for relaxation of element spacing (i.e. a technique to increase antenna element spacing without creating grating lobes) to cover a desired scan volume. Prior attempts to increase antenna element spacing in an ESA to reduce the number of elements for cost savings have resulted in a need to relax (i.e. reduce) the scan requirements of an ESA and/or of a radar system.

Thus, the concepts, systems and techniques disclosed herein allow for increased scan coverage with a reduced antenna element count and have direct applicability to all ground based, ship based, and airborne electronically scanned arrays (ESA) and multifunction radio frequency (RF) systems. Accordingly, the concepts, systems and techniques disclosed herein provide a clear advantage in the pursuit for greater functionality while at the same time achieving a reduction in SWaP-C (Size, Weight, Power, Cost) requirements in radar and other RF systems.

Thus, in accordance with a first aspect of the concepts, systems and techniques described herein, an AESA radar system capable of operating over a wide scan range includes a phased array antenna having antenna elements responsive to signals at two or more frequencies and which are spaced by a distance which is greater than antenna element spacing used in prior art approaches at a given operating frequency or a given range of operating frequencies. The antenna element spacing is selected, at least in part, based upon the at least two operating frequencies of the radar system and/or a desired overall scan angle range to be achieved by the radar system. By increasing the antenna element spacing, the total number of antenna elements in the AESA can be reduced while still enabling radar system operation over a wide scan range. The AESA radar system further includes a receiver capable of processing information received at both the first and second RF frequencies. This may be achieved with a single receiver or with two or more receivers with each receiver capable of processing signals at one or more selected ones of the two or more operating frequencies of the AESA radar system. Thus, in embodiments utilizing multiple receivers, the receivers may each process signals at a single frequency or some receivers may process signals at a single frequency and other receivers may process signals at multiple frequencies.

At the first frequency, the AESA antenna elements form a first beam having a first boresight angle and capable of scanning over a first range of angles (i.e. a first scan range). At the second frequency, the same AESA antenna elements form a second beam having a second different boresight angle and capable of scanning over a second, different range of angles (i.e. a second scan range).

In embodiments, the first and second scan ranges are substantially contiguous thereby resulting in an overall (or total) scan range of the AESA. Thus, configuring the AESA radar system for operation at two or more distinct frequencies increases the total scan range over which the AESA radar system may operate.

In embodiments, the first and second scan ranges can be selected by appropriately selecting a pair of operational frequencies of the AESA radar system.

In some embodiments, scan angles corresponding to the two or more frequencies can be modified resulting in an increase in the spacing between the array elements and thus a reduction in the total number of array elements in the ESA. For example, the first scan angle can be reduced based at least in part on the coverage second scan angle. Thus, the spacing of the array elements can be modified (e.g., increased) due to the change (e.g., reduction) in the first or second scan angle. In an embodiment, by increasing the array element spacing, the total number of array elements in the ESA can be reduced.

The ESA may include a transmit/receive modules (TRMs) configured for operation at two or more frequencies. The TRMs can be disposed in a signal path between the plurality of array elements and an ESA. For example, the TRMs can provide generate RF signals at two or more frequencies to the plurality of array elements. In some embodiments, the TRMs can receive RF signals at two or more frequencies from the plurality of array elements and process the RF signals.

In a first aspect, the present disclosure is directed towards a dual frequency electronically scanned array (ESA) system. The ESA comprising a plurality of array elements forming a first aperture and being responsive radio frequency (RF) signals at a first frequency over a first scan angle and the plurality of array elements forming a second aperture and being responsive to RF signals at a second frequency over a second different scan angle. The second effective aperture can be angled with respect to the first effective aperture by an amount that allows wavelengths of RF signals transmitted or received at the second aperture, as compared to the first effective aperture, to be in even multiples. The plurality of array elements being spaced by an amount corresponding to at least one of the first scan angle or the second scan angle.

The ESA has a first effective aperture having a first boresight angle at the first frequency and a second effective aperture having a second boresight angle at the second frequency.

In some embodiments, a difference between a first boresight angle at the first frequency and a second boresight angle at the second frequency corresponds to a scan angle limit of at least one of the first scan range angle or the second scan range. A total scan range of the ESA can correspond to a combination of the first and second scan ranges. The first and second scan ranges can be selected to reduce a number of antenna elements needed in an array without reducing the overall scan range (or scan volume) and without introducing grating lobes within the scan volume of interest.

In another aspect, a method for forming a dual frequency electronically scanned array (ESA) is provided. The method comprises providing a plurality of array elements configured to transmit and receive radio frequency (RF) signals at two or more frequencies, forming a first effective aperture using the plurality of array elements at a first frequency and forming a second effective aperture using the plurality of array elements at a second frequency. The first effective aperture has a first scan range and the second effective aperture has a second scan range different form the first scan range. The method further comprises selecting a spacing between the plurality of antenna elements based upon at least one of the first and second scan ranges.

In some embodiments, the first scan range or the second scan range can be modified based upon a total scan angle. The spacing between each of the plurality of antenna elements can be modified in response to modifying at least one of the first and second scan ranges.

In another aspect, a dual frequency electronically scanned array (ESA) radar system includes a plurality of array elements configured to transmit and receive radio frequency (RF) signals at two or more frequencies. When operating at the first frequency the ESA has a first boresight beam pointing angle and a first scan angle and when operating at a second different, frequency the ESA has a second boresight beam pointing angle and a second scan angle different from the first scan angle. The plurality of array elements are spaced by an amount corresponding to at least one of the first scan angle or the second scan angle. A plurality of transmit/receive modules can be coupled to the plurality of array elements to generate and process the RF signals at the two or more frequencies.

In some embodiments, the ESA comprises the first ESA having a first boresight angle at the first frequency and the second ESA having a second boresight angle at the second frequency. A difference between a first boresight angle at the first frequency and a second boresight angle at the second frequency corresponds to a scan limit of at least one of the first scan angle or the second scan angle.

BRIEF DESCRIPTION OF THE DRAWINGS

The foregoing features may be more fully understood from the following description of the drawings in which.

DETAILED DESCRIPTION

The foregoing concepts and features may be more fully understood from the following description of the drawings. The drawings aid in explaining and understanding the disclosed concepts sought to be protected. Since it is often impractical or impossible to illustrate and describe every possible variation of the broad concepts described herein, the provided figures depict one or more illustrative embodiments. Accordingly, the figures are not intended to limit the scope of protection afforded the concepts, systems and techniques described herein. Like numbers in the figures denote like elements.

Figure 1:
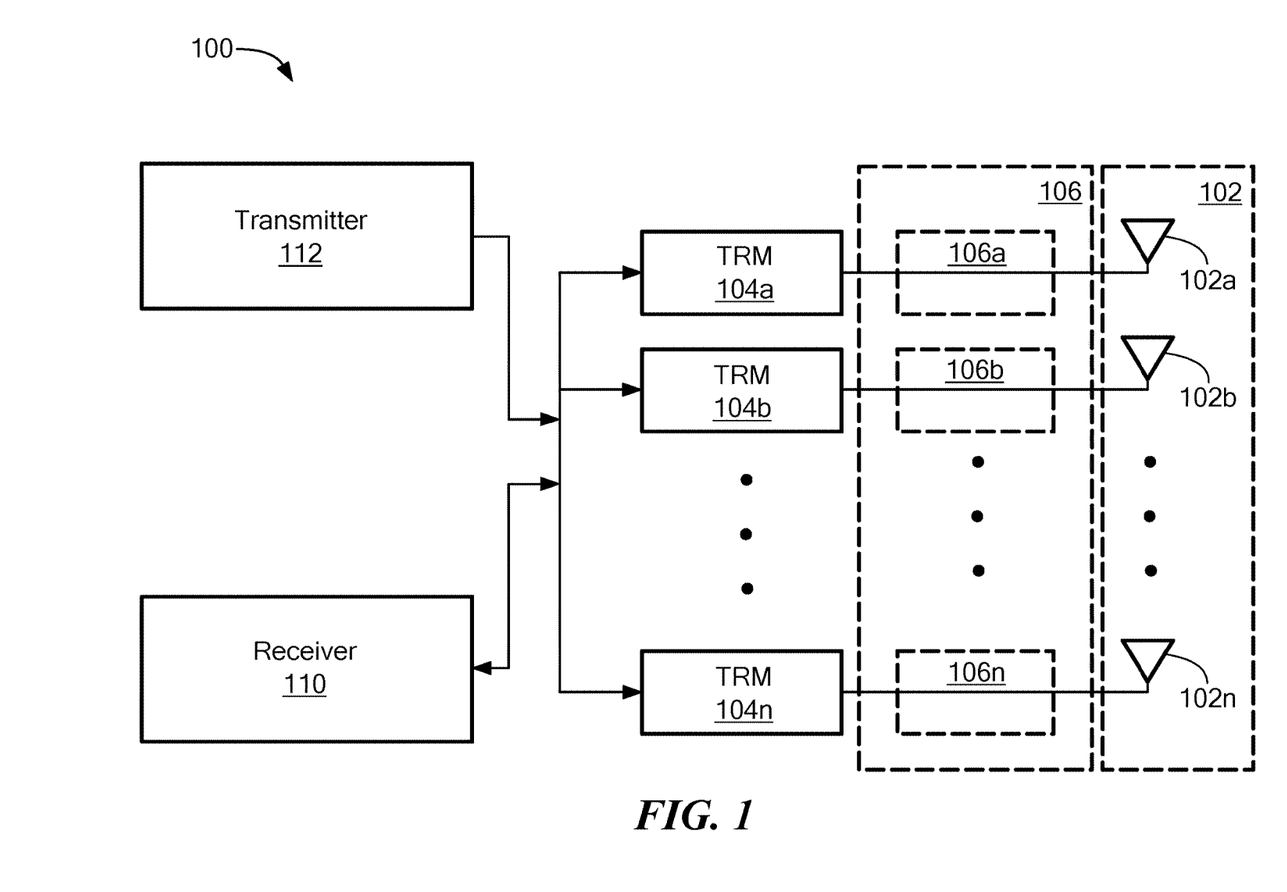
FIG. 1 is a block diagram of a dual frequency electronically scanned array (ESA) system.

Now referring to FIG. 1, an active electronically scanned array (AESA) radar system 100 includes an array antenna 102 provided from a plurality of antenna elements (or more simply "elements") 102a-102n generally denoted 102. Each element 102 has a first port coupled to a first port (aka an "antenna port") of a corresponding one of a like plurality of transmit/receive modules (TRMs) 104a-104n. Second ports (aka "receiver/transmitter ports") of each of the plurality of TRMs 104a-104n are coupled to a receiver 110 and a transmitter 112, as is generally known. Receiver 110 may be provided as any type of receiver capable of receiving signals at desired frequencies of the radar system. Transmitter 112 may be provided as any type of transmitter capable of providing signals at desired transmit frequencies of the radar system.

It should be appreciated that the concepts, systems and methods described herein may also apply to electronically scanned arrays (ESAs) and passive electronically scanned arrays (PESAs), in addition to AESAs. Further, the term ESA as used herein may apply to both an AESA and/or a PESA.

In some embodiments, a switch matrix 106 (shown here in phantom) may optionally be disposed in a signal path between antenna elements 102a-102n and the TRMs 104a-104n. For example, switch matrix 106 may be used in embodiments having separate transmit modules and receive modules to switch between transmit and receive modes of the radar system. Optional switch matrix 106 provides selectable signal paths between array elements 102a-102n and desired ones of TRMs 104a-104n as is generally known.

Significantly, AESA radar system 100 operates at two distinct frequencies. Thus, elements 102, receiver 110 and transmitter 112 must also be able to operate at the two distinct frequencies of the radar system. In some embodiments, elements 102, receiver 110 and transmitter 112 can also be configured to operate (e.g., transmit/receive) over the expanded frequency range (i.e., from the first frequency to the second frequency).

At a first frequency, the radar system (and in particular array 102) has a main beam having a boresight at a first angle. For example, at an operational frequency of 8 GHz the main beam may be at the antenna broadside (i.e. a zero degree scan angle relative to the physical aperture of the array). At a second different frequency (e.g. an operational frequency of 17.9 GHz), the radar system (and in particular array 102) has a main beam having a boresight at a second different angle (e.g. a 63 degree angle relative to the physical aperture of the array).

For reasons, which will become apparent from the description herein below, the first and second frequencies at which the radar system operates are thus selected such that the two boresight angles point in different directions. (i.e. the antenna boresight angle at the first frequency is different from the antenna boresight angle at the second frequency). It should be appreciated that in some embodiments, the first frequency is the lower frequency and the second frequency is the higher frequency with respect to each other.

More particularly, it has been recognized that frequencies are selected such that transmit/receive (Tx/Rx) information along the second angle (e.g. the 63° degree angle) corresponds to exact multiples of wavelength ($\lambda$) at the second frequency. Thus, if the information is transmitted/received at the second frequency, then information received at the actual aperture (i.e. the physical aperture) is the same as if it had arrived simultaneously at a planar aperture angled (or tilted) at the second boresight angle. Further details and examples will be described below in conjunction with FIGS. 2-5.

Accordingly, receiver 110 and transmitter 112 are respectively configured to receive/transmit signals at the two (or more) distinct frequencies at which the radar system transmits and receives (i.e. the operating frequencies of the radar system). In some embodiments, receiver 110 is configured to receive signals over a range of frequencies which includes the operating frequencies of the radar system. In some embodiments, the radar system may include multiple receivers with each receiver configured to receive signals at a desired frequency (i.e. one or more of the operating frequencies of the radar system). Similarly, in some embodiments, transmitter 12 is configured to transmit signals over a range of frequencies which includes at least the operating frequencies of the radar system. In some embodiments, multiple transmitters may be used with each transmitter configured to transmit signals at a desired frequency (i.e. one or more of the operational frequencies of the radar system).

In some embodiments, selected ones (or all) of antenna elements 102a-102n may be provided as so-called "active" elements (e.g., antenna elements through which RF signals may be emitted when the radar system is operating in a transmit mode). In some embodiments, some (or all) of antenna elements 102a-102n may be provided as so-called "passive" elements (i.e. not coupled to a transmit signal path). In still other embodiments, some (or all) of antenna elements 102a-102n may be provided as both active and passive elements (e.g. when the radar system is operating in a receive mode, the elements are passive and when the radar system is operating in a transmit mode, the same elements are active).

It should thus be recognized that some or all of TRMs 104a-104n can be configured to transmit and/or receive signals at multiple distinct frequencies (e.g. two or more distinct frequencies) or over a range of frequencies and appropriately process the RF signals.

In a receive mode, the TRMs receive signals provided thereto from array 102 and appropriately processes the signals and provides the so-processed signals to receiver 110. Receiver 110 further processes the signals to determine various properties of received RF signals, including but not limited to frequency, angle, and/or phase data.

In a transmit mode, TRMs 104a-104n can be configured to provide appropriately amplitude and phased weighted RF signals at two or more different frequencies (or over a range of frequencies) to respective ones of array elements 102a-102n.

TRMs 104a-104n may include transmit modules and receiver modules that are combined and share common circuitry or a single housing. In general, TRMs 104a-104n include various circuitry and/or components to facilitate operation of ESA 100. TRMs 104a-104n may include components such as one or more amplifiers, one or more switches, one or more attenuators, one or more phase shifters, one or more low noise amplifiers (LNAs). Some or all of the TRM circuitry and/or components may be implemented as monolithic microwave integrated circuits (MMICs).

In some embodiments, TRMs 104a-104n may include separate transmit and receive circuitry disposed in separate housings and thus may connect to respective ones of array elements 102a-102n individually through switch matrix 106.

Receiver 110 may include analog and/or digital components including but not limited to a processor, a volatile memory and a non-volatile memory (e.g., hard disk). The non-volatile memory can store computer instructions, an operating system and data. In an embodiment, the data may include data collected corresponding to signals transmitted from and/or received at one or more array elements 102a-102n. The data may include complex I/Q data representing the signal. For example, in some embodiments, the data may include complex voltage signals representative of angle, amplitude, phase, and/or a polarization of the signal. The data may include an angle measurement of the signal relative to the phase center of the respective array element that received the signal. In an embodiment, the data may be a snapshot of the signal at a predetermined period of time or over a predetermined time period. In some embodiments, the data may be used to generate RF signals to be transmitted by ESA 100.

In some embodiments, non-volatile memory may include one or more look-up tables for storing and organizing captured data corresponding to signals received at one or more array elements 102a-102n, as well as any tables or matrices generated using the samples of the captured data. In other embodiments, non-volatile memory may include one or more look-up tables for storing and organizing instructions for generating signals to be transmitted at multiple different frequencies by array elements 102a-102n. In one example, the computer instructions can be executed by the processor out of volatile memory.

Receiver 110 may be implemented, at least in part, as a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. Alternatively, the system may be implemented, at least in part, as firmware.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform methods useful for radar processing operations.

Figure 2:
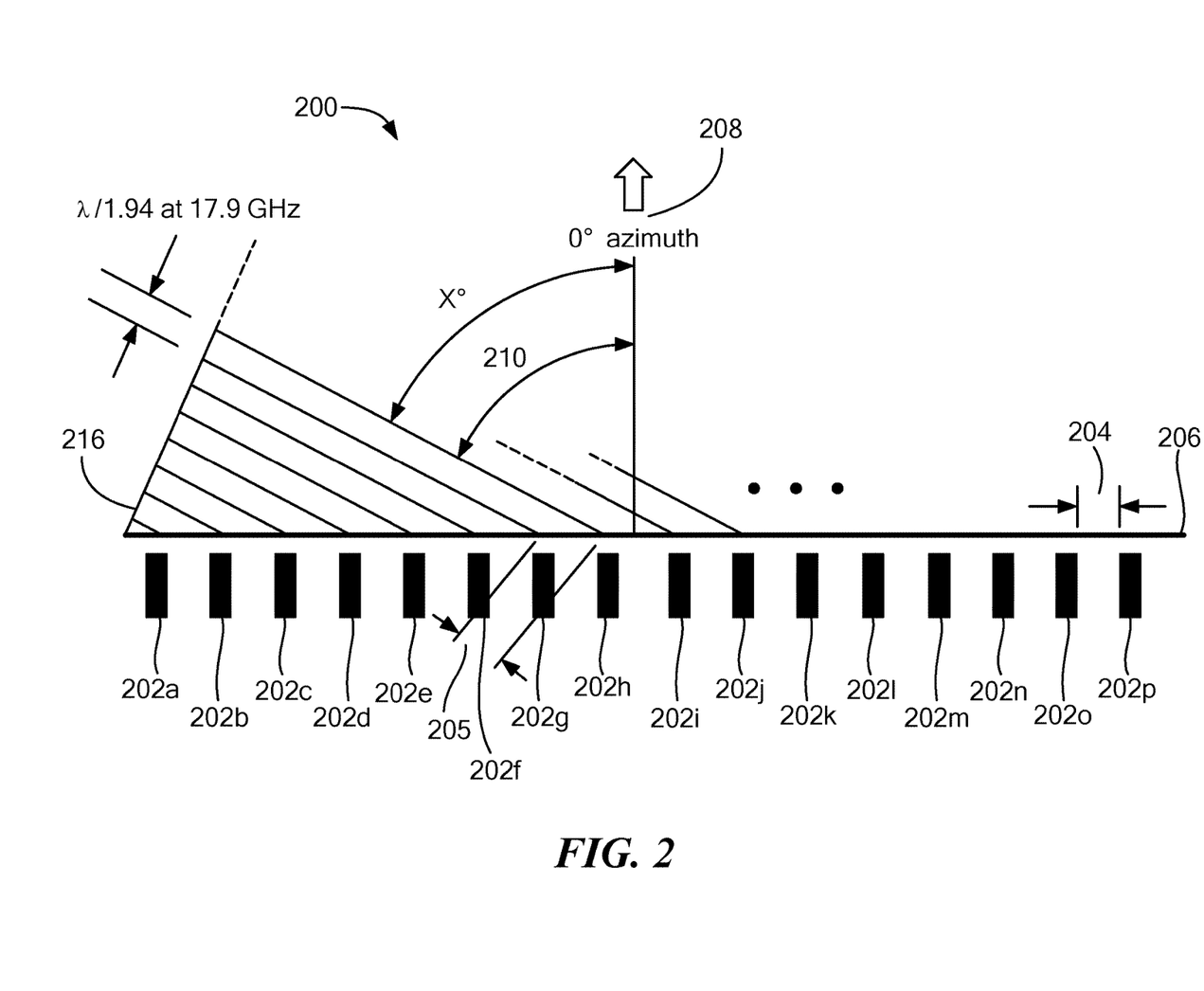
FIG. 2 is a diagram of an ESA having a first main beam at first boresight angle at a first frequency and a second main beam at a second boresight angle at a second different frequency.
Figure 2A:
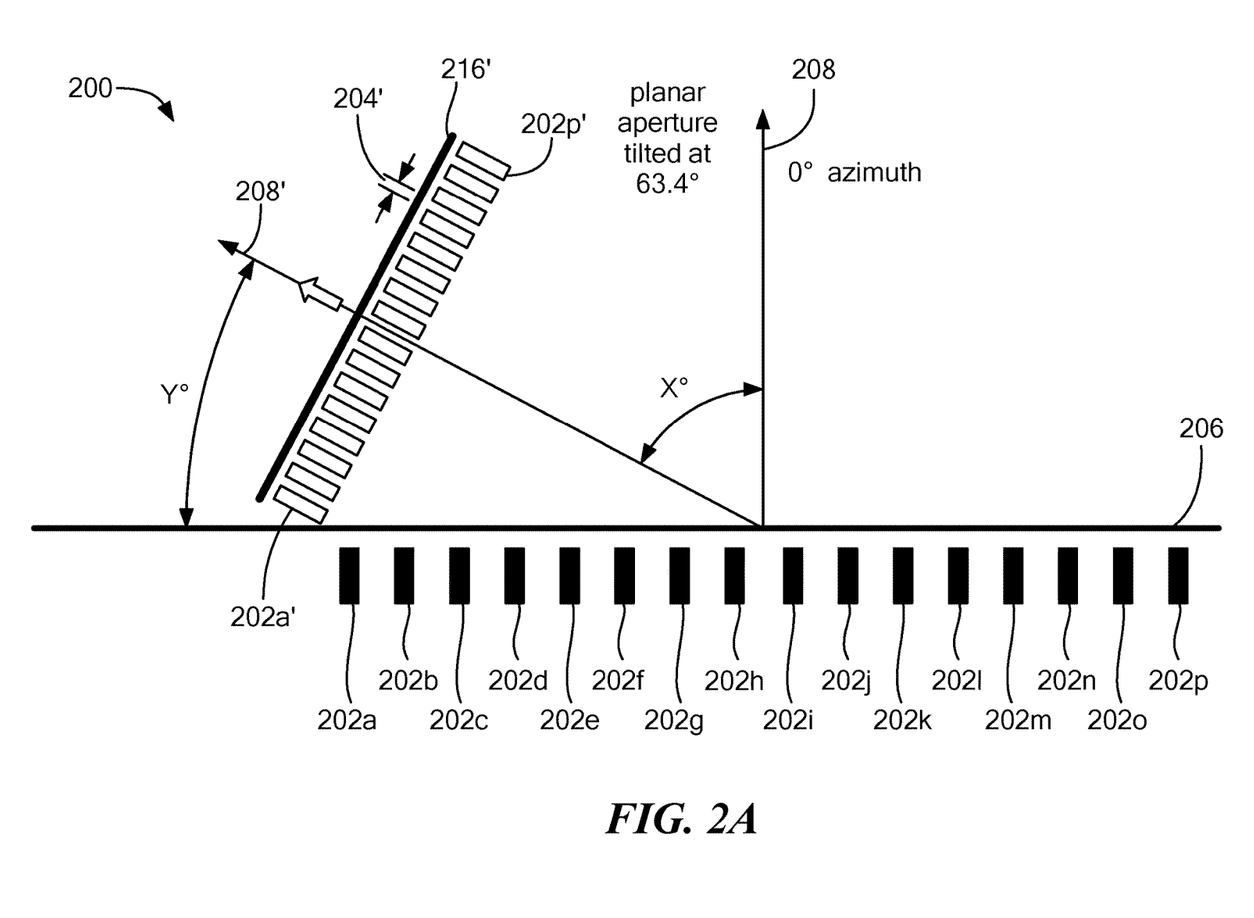
FIG. 2A is a diagram illustrating a scan angle and a boresight angle of the ESA of FIG. 2 at a second frequency.

Now referring to FIGS. 2-2A, in which like elements are provided having like reference designations, an ESA 200, here shown as a linear phased array, includes a plurality of antenna elements, here sixteen (16) antenna elements 202a-202p, generally denoted 202. ESA 200 may be the same as or similar to ESA 102 described above in conjunction with FIG. 1. Each element 202 is spaced apart from an adjacent element by a predetermined distance 204 (referred to herein as "element spacing" 204 or more simply "spacing" 204) along a plane.

A radar system which includes ESA 200 is configured to operate at two or more different frequencies. At a first frequency, the elements are spaced apart by one-half (½) wavelength (λ) and the ESA 200 has a first effective aperture 206, a first boresight angle 208 (i.e. broadside to the array 200) and a first scan angle range (or more simply "scan range"). For clarity only one-half (½) the scan range is shown in FIGS. 2 and 2A with the one-half scan range denoted with reference numeral 210 as X degrees (X°) with respect to the boresight angle 208. Thus, at the first frequency the full scan range is 2X degrees (2X°) with respect to the boresight angle 208.

The scan angle limit of X° represents a limit of the field of view (in one direction) for ESA 200. Thus, in some embodiments, ESA 200 cannot transmit or receive RF signals outside of the scan angle limit of X° degrees with an amount of accuracy required to ensure proper and reliable operation of a radar system of which the ESA 200 is a part.

In accordance with an aspect of the concepts sought to be protected herein, it has been discovered that for a given element spacing 204, there exists a second frequency at which the radar system may be operated and when operating at this second frequency, the ESA 200 has a second effective aperture 216 which is tilted at a predetermined angle. That is, if an RF signal is transmitted/received at this second frequency, then the information at the actual aperture (i.e. the physical aperture) is the same as if it had arrived simultaneously at a planar aperture tilted at an angle of X degrees (X°).

For example, in one illustrative embodiment elements 202 may be spaced at a distance of one-half wavelength at a frequency of 8.0 GHz (i.e. element spacing 204 is ½λ at a frequency of 8 GHz). Thus, the first operating frequency of the radar system is 8.0 GHz. This arrangement allows ESA 200 to scan over a range of ±70° relative to the ESA boresight 208 (i.e. X°=70° and the full scan range is 140°).

If the radar system is operated at a frequency of 17.9 GHz, (i.e. a second operating frequency of the radar system) the information at the actual aperture (i.e. the physical aperture of ESA 200) is the same as if it had arrived simultaneously at a planar aperture tilted at an angle of 63.4 degrees (relative to the ESA boresight at the first frequency as denoted by reference numeral 208). Furthermore, the ESA can scan over a range of approximately 27° relative to the ESA boresight at the second frequency (with the ESA boresight at the second frequency being denoted by reference numeral 208' in FIG. 2A). Combing the scan range at the first frequency (approximately 63°) with the scan range at the second frequency (approximately 27°) gives the radar a total scan range of ±90° (or near ±90°) relative to the ESA boresight at the first frequency. Thus, the first scan angle range combined with the second scan angle range provides a total scan angle range of the radar system.

That is, if an 8.0 GHz (in this example) ESA having an element spacing 204 equal to λ/1.94 at a frequency of 8.0 GHz, scans to an angle of 63.4° off boresight 208, then the ESA is capable of transmitting and receiving signals at a frequency of 17.9 GHz and the information that is transmitted and received at the 8.0 GHz aperture is substantially identical to information as if it had been transmitted and received at a planar aperture (i.e. effective aperture 216) that is tilted at an angle of 63.4° at a frequency of 17.9 GHz. This is due to each planar element being an exact multiple of λ (at 17.9 GHz) distance from the actual antenna elements 200 (i.e. spacing 205 is λ at a frequency of 17.9 GHz). Thus, as illustrated in FIG. 2, the radar system can operate as though it is receiving signals through an aperture (i.e. the second effective aperture 216) formed from antenna elements spaced apart by a distance of λ/1.94 at a frequency of 17.9 GHz.

For reasons which will be explained further below, it should be appreciated that although in this illustrative embodiment, the elements 202 are spaced by a distance corresponding to one-half wavelength at the first operational frequency of the radar system, in some embodiments other element spacing may be used. The element spacing 204 can be selected and/or modified based, at least in part, upon trade-offs between a desired operational frequency and/or a desired scan range required to meet the needs of a particular application.

It should also be appreciated that although a linear array is illustrated in FIGS. 2 and 2A, in general ESA 200 may be provided having any regular (e.g. rectangular, circular, oval) or irregular array shape and any regular (e.g. grid, triangular, etc.) or irregular lattice structure. In some embodiments, such as those having a circular shape or a semi-circle shape, dual frequency techniques described herein may be implemented to extend the respective ESA's scan range beyond that of the original circular or semi-circle's scan range.

Referring to FIG. 2A, when operating at the second frequency, effective aperture 216 is formed from elements 202a'-202p' (generally denoted 202') which correspond to projections of actual elements 202a-202p. Elements 202' are spaced apart by a predetermined distance 204' which corresponds to one-half wavelength at the second frequency. Thus, in the above example in which the first frequency is 8 GHz and the second frequency is 17.9 GHz, element spacing 204' corresponds to one-half of a wavelength ($\lambda$) at a frequency of 17.9 GHz.

Furthermore, at the second frequency, ESA 200 has a second boresight angle 208' and a second scan range of Y degrees (Y°) with respect to the second boresight angle 208'. Thus, as noted above in conjunction with FIG. 2A, at the second frequency ESA 200 can have a scan angle limit of Y° with respect to the second boresight angle 208'. The scan angle limit of Y° represents a limit of the field of view in one direction when ESA 200 transmits/receives signals at the second frequency.

Significantly, each of array elements 202' forming the second effective aperture 216 are a multiple of a wavelength (at the second frequency) distance from the array elements 202 which form the first effective aperture 206 at the first frequency. In some embodiments, the second effective aperture 216 can be angled with respect to the first effective aperture 206 by an amount that allows wavelengths of the RF signals transmitted or received at the second effective aperture 216, as compared to the first effective aperture 206, to be in even multiples. Thus, the combination of the first scan angle and the second scan angle results in a radar system having a total scan angle which is increased relative to conventional radar systems operating at the first frequency.

Figure 2B:
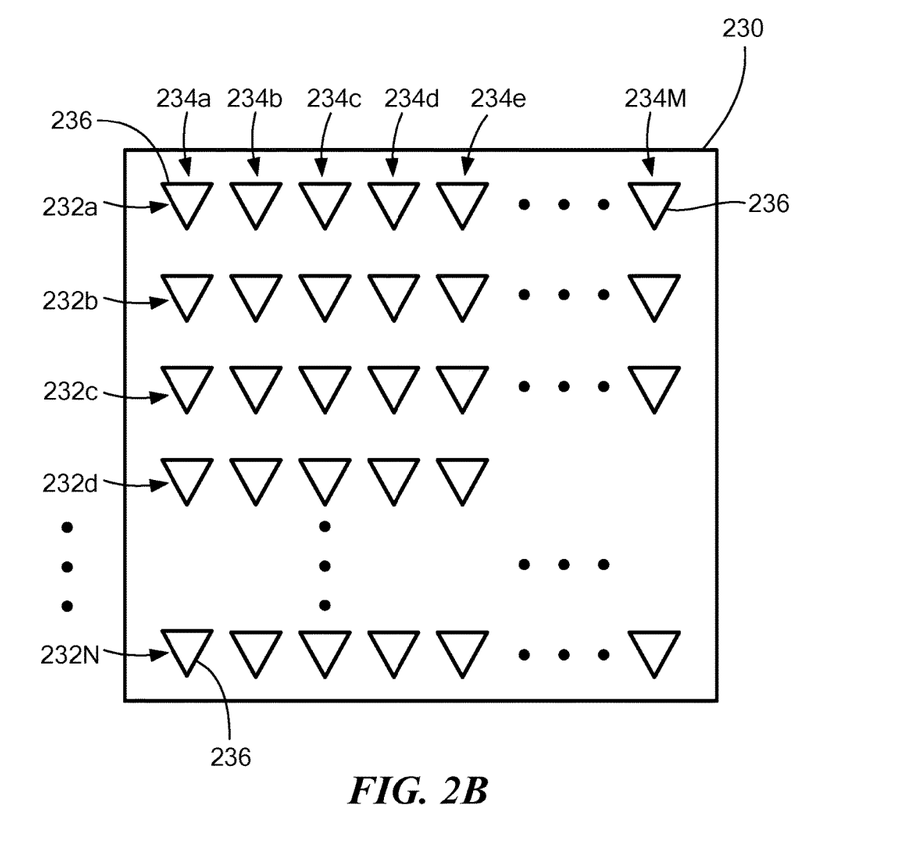
FIG. 2B is a diagram of the array elements of ESA of FIG. 1 configured as a planar array.

Referring now to FIG. 2B, it should be appreciated that although FIG. 2 illustrates a linear array 230 having a plurality of rows 232a-232N and columns 234a-234M formed by individual antenna elements 236. As noted above, the concepts described herein also apply to a planar array having any array shape and any element lattice structure. Array elements 236 may be the same as or similar to the array elements described above in conjunction with FIGS. 1-2B.

Figure 3:
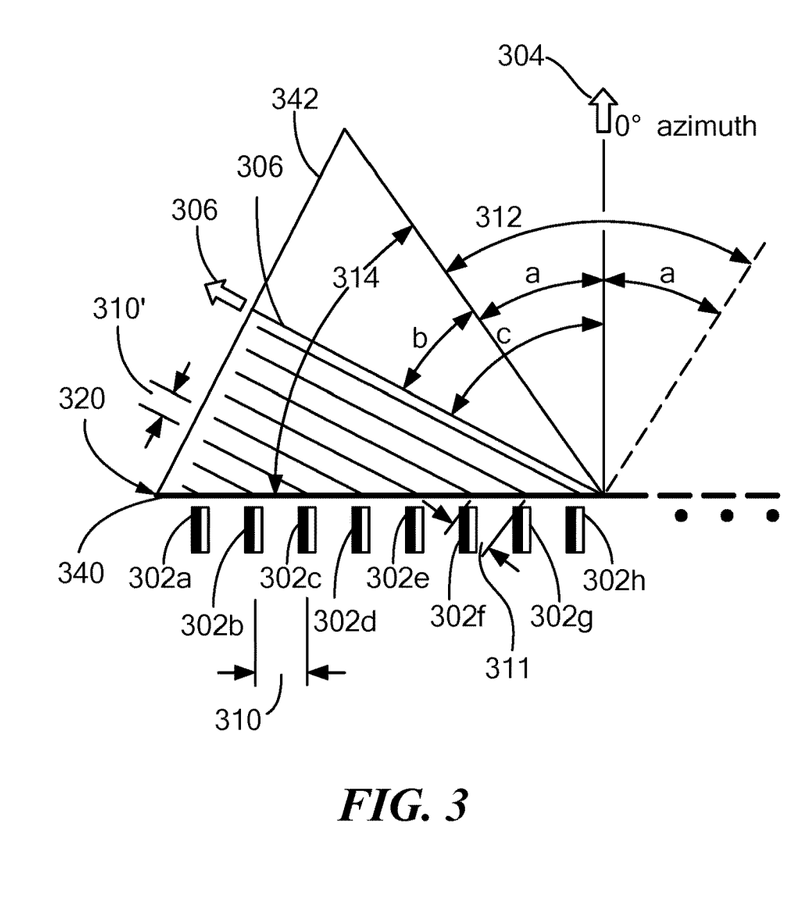
FIG. 3 is a diagram of an ESA having array elements configured for operation at a first and second frequency.

Now referring to FIG. 3, an ESA 300 includes a plurality of antenna elements 302a-302n with each of the elements spaced apart by a predetermined distance 310 (referred to herein as spacing 310) along a plane 320. ESA 300 can be configured for operation at first and second frequencies. In some embodiments, ESA 300 can be configured for operation over a range of frequencies extending, for example, from the first frequency to the second frequency. The range of frequencies may be referred to as a frequency bandwidth of ESA 300.

Each of array elements 302a-302n can be configured to transmit and/or receive RF signals at a first frequency, a second frequency or over a range of frequencies ranging from the first frequency to the second frequency. In some embodiments, array elements 302a-302n may be provided having a wide operational frequency bandwidth (and thus are sometimes referred to as wideband elements).

In some embodiments, a first portion of array elements 302a-302n can be configured to transmit and/or receive RF signals at the first frequency and a second portion, different from the first, can be configured to transmit and/or receive RF signals at the second frequency. Phase settings for the respective ones of array elements 302a-302n may be changed simultaneously for each frequency. For example, the first portion of array elements 302a-302n can scan at the first lower frequency and the second portion of array elements 302a-302n can scan at the second higher frequency over the respective angular range for ESA 300, such as in a "search mode" or "track mode."

As noted above in conjunction with FIGS. 1-2B, at the first frequency, array elements 302a-302n form an aperture 340 capable of scanning up to a scan angle identified with reference letter "a" with a scan range 312 corresponding to two times scan angle a with respect to a boresight angle 304 at the first frequency (i.e. the scan range at the first frequency is ±a ° and is designated by reference numeral 312). ESA 300 is configured to transmit and/or receive RF signals over the first scan range 312 at the first frequency.

At the second frequency, different from the first frequency, the same array elements 302a-302n may form a beam having a second boresight angle 306 and a second scan range 314 with respect to the second boresight angle 306. Array 300 is configured to transmit and/or receive RF signals over the second scan angle 314 at the second frequency (i.e. the scan range at the second frequency is ±b° and is designated by reference numeral 314).

Figure 3A:
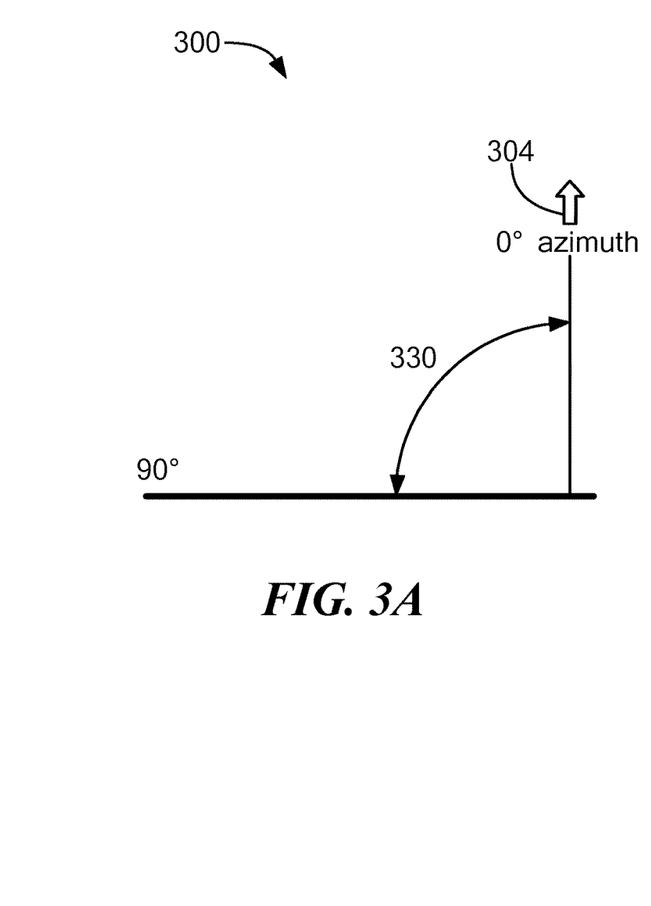
FIG. 3A shows an illustrative scan angle range of a system of the type described above in conjunction with FIGS. 1-3.

ESA 300 thus has a first scan range 312 at the first frequency and a second different scan range 314 at the second frequency. Using one-half the first scan range 312 and the full second scan range 314 results in a total scan range 330 (FIG. 3A). That is, in this example, a combination of the first and second scan ranges 312, 314 provides a total scan range of about 90°. Thus, by providing ESA 300 having dual or multiple frequency array elements 302a-302n and appropriately selecting the first and second frequencies results in an ESA which provides scan range benefits as shown by the increased scan range 330 (a scan range of substantially 90° from antenna boresight 304).

For example, an ESA can now be configured to have a faux 17.9 GHz ESA (i.e. effective aperture 342) boresighted at 63° to scan +/−27° (from 36° off 0° azimuth to virtually 90°). This requires that each T/R element (e.g. T/R elements 104 in FIG. 1) be capable of wideband frequency operation from 8.0-17.9 GHz or that each T/R element be capable of operating at two distinct frequencies (i.e. both the 8 GHz and 17.9 GHz frequencies, in this example). With the 17.9 GHz faux ESA covering from 36° (off 0° azimuth) to virtually 90°, the remaining scan angle from 0° azimuth to 36° is covered by the 8.0 GHz elements (i.e. effective aperture 340).

That is, the faux 17.9 GHz ESA boresighted at 63° can be used to scan +/−27° (from 36° off 0° azimuth to virtually 90°). Since 36° to virtually 90° coverage is from the 17.9 GHz faux ESA, the remaining scan angle from 0° azimuth to 36° is covered by the 8.0 GHz elements.

It has also been recognized in accordance with a further aspect of the concepts disclosed herein, that further optimization is possible. In particular, the ESA in this example, can now be optimized by increasing the element spacing. Since the 8.0 GHz elements only scan to 36°, the element spacing can be opened up (i.e. increased) by as much as 22%. That is, the original element spacing may be computed as spacing=1/(1+sin 70°) while the optimized element spacing may be computed as spacing=1/(1+sin 36°). Such increased antenna element spacing, however, shifts the second frequency to 14.67 GHz from 17.9 GHz. Thus, in the ESA having the optimized element spacing, 0° azimuth to 36° is covered by the 8.0 GHz elements (i.e. effective aperture 340) and the faux 14.67 GHz ESA (i.e. effective aperture 342) boresighted at 63° may be used to scan +/−27° (from 36° off 0° azimuth to near 90° or virtually 90°).

As noted above, since the 8.0 GHz elements only scan to 36°, the element spacing can be opened up by 22%—this accomplishes two important things: (1) it lowers the faux frequency by 22% to 14.67 GHz from 17.9 GHz; and (2) it reduces the number of T/R elements by 22% squared (azimuth and elevation). Thus, In this example after optimization: the element spacing 310 is changed to λ/1.59 at a frequency of 8 GHz (for up to +/−36 degree scan range) compared with the prior (non-optimized) element spacing of λ/1.94 at a frequency of 8 GHz; and the apparent element spacing 311 is λ at a frequency of 14.67 GHz (for a scan range of +/−27°—i.e. for scan range 314 which extends from 36° off 0° azimuth 304 to virtually 90°).

Thus, this antenna element spacing optimization technique may be used to eliminate up to one-third the number of antenna elements and T/R modules needed in the ESA. Thus, the techniques described herein enables increased scan coverage with a reduced antenna element count.

Stated more generally, it has been further recognized that each of the array elements 302a-302n can be spaced apart by a predetermined distance 310 that is selected based, at least in part, upon one or more desired operating frequencies and/or scan angles. In some embodiments, having array elements 302a-302n configured to operate at two or more frequencies, spacing 310 between each of array elements 302a-302n can be modified (e.g., increased). For example, upon an initial design, the first scan range 312 may overlap with the second scan range 314. Thus, to achieve the same total scan range 330, the individual coverage of the first and/or second scan ranges 312, 314 can be reduced without changing the total scan range 330. In accordance with the concepts sought to be protected herein, it has been recognized that this may be accomplished by adjusting the spacing between antenna elements.

The spacing 310 between the array elements 302a-302n may initially be determined using the following equation:

$$\text{Spacing} = \frac{1}{(1+\sin(\varphi))}$$

Where $\varphi$ represents an angle which defines a limit of the first scan range. Thus the angle $\varphi$ sets the element spacing.

For example, an ESA operating at 8.0 GHz and having an antenna element spacing of λ/1.94 at a frequency of 8 GHz may have a scan range of ±70° relative to the ESA boresight 304. (i.e. $\varphi=70°$). Thus, the element spacing may be computed as:

$$\text{Spacing} = \frac{1}{(1+\sin(70°))}.$$

However by reducing the first scan range from angle $\varphi$ (where $\varphi$ equals 70° in the above equation) to angle 'a' where angle a equals 36°, the spacing 310 between each of the antenna elements 302a-302n may then be computed as:

$$\text{Spacing} = \frac{1}{(1+\sin(36°))}$$

This results in increased spacing between the antenna elements and for a given size aperture, increased spacing between the antenna elements results in fewer overall antenna elements.

That is, an increase in spacing between each of antenna elements 302 results in a reduction in the total number of antenna elements needed in the array 300 while providing the same, or even an increased, level of performance (e.g. a system having increased scan range). Further still, reducing the number of antenna elements in an array results in costs savings. Thus, ESA 300 can operate over a total scan range corresponding to scan range 330 with a reduced number of antenna elements as compared to an ESA provided from antenna elements operating at a single frequency.

Furthermore, it should also be appreciated that in some embodiments, rather than decreasing the range of the first scan range (e.g. to ±36° from +70° as in the above example), it is also possible to increased spacing between the antenna elements by decreasing the range of the second scan range. Further still, it is also possible to increase spacing between the antenna elements by decreasing the range of both the first and second scan ranges.

The increased spacing 310 is possible because for systems provided in accordance with the concepts and techniques described herein, the total scan range is provided from a combination of the first and second scan ranges 312, 314. Significantly, increase antenna element spacing does not result in grating lobes within a desired scan volume. This is because the scan ranges 312, 314 at the first and second frequencies are reduced as compared to prior art systems having the same total scan range.

It should further be appreciated that the various properties of ESA 300 (e.g., operating frequencies, spacing of array elements 302a-302n, boresight angles 304, 306, scan angles 312, 314, and total scan angle 330) can be selected and scaled accordingly for operation at particular frequencies and particular applications of an ESA. Further, each one of: operating frequencies, spacing of array elements 302a-302n, boresight angles 304, 306, scan angles 312, 314, and total scan angle 330 can be selected and determined based at least in part on one or a combination of the other properties of the ESA.

For example, in one embodiment, the first scan range and spacing between each of the array elements can be determined based upon the first operating frequency. The second frequency and second scan range can then be determined based, at least in part, upon the first frequency and the first scan range. In some embodiments, the first and/or second scan ranges may be modified. For example, and as noted above, if the first and second scan ranges overlap, the first and/or scan ranges may be reduced to avoid any overlap. As a consequence of reducing the first and/or scan ranges, the antenna element spacing may be modified. For example, the spacing between antenna elements in the array may be increased and thus, the total number of array elements may be reduced.

Figures 4, 4B:
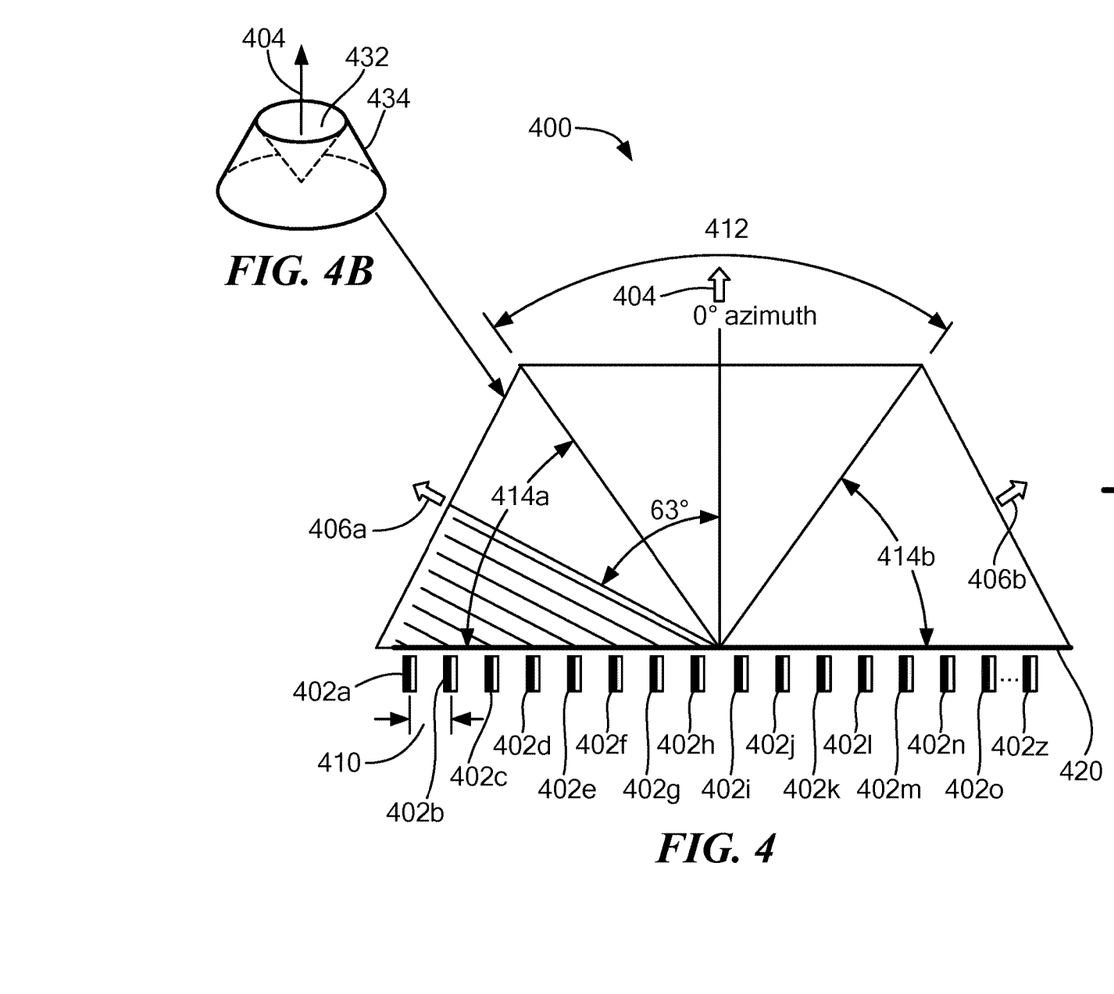
FIG. 4 is an isometric view of a dual frequency ESA having a truncated cone shape.
FIG. 4B shows an illustrative total scan volume which may be provided by a system of the type described above in conjunction with FIGS. 1-4.

Now referring to FIG. 4, an ESA 400 includes a plurality of array elements 402a-402z, generally denoted 402, spaced apart by a predetermined distance 410 (referred to herein as spacing 410) along a plane 420 (i.e. ESA 400 is here shown as a planar array).

ESA 400 is configured for operation at a first and second frequency. In some embodiments, ESA 400 can be configured for operation over a range of frequencies, for example, from the first frequency to the second frequency. The range of frequencies may be referred to as a bandwidth of ESA 400. Each of array elements 402a-402z can be configured to transmit and/or receive RF signals at a first frequency, a second frequency or a range of frequencies ranging from the first frequency to the second frequency.

At the first frequency, array 400 has first boresight angle 404 and a first scan range 412 with respect to the first boresight range 404. At the second frequency, different from the first frequency, the array has a second boresight angle 406a, 406b and a second scan range 414a, 414b with respect to the second boresight angle 406a, 406b.

Thus, when operating at the first frequency, ESA 400 has a first scan range 412 and when operating at the second frequency, the ESA 400 has a second different scan range 414a, 414b. The combination of the scan ranges 412, 414a, 414b correspond to a total scan range 430 of the ESA 400. As illustrated in FIG. 4, the first scan range 412 and the second scan angle range 414a, 414b are contiguous (i.e. there are no "gaps" in the total scan range). In some embodiments, the total scan range 430 may correspond to about ±90° of coverage with respect to the first boresight angle 404.

Each of the array elements 302a-302n can be spaced a predetermined distance 310 that is selected based, at least in part, upon one or more desired operating frequencies and/or ranges of scan angles. In some embodiments, having array 300 configured to operate at two or more frequencies, spacing 310 between each of the antenna elements 302a-302n can be modified (e.g., increased). For example, the first scan range 312 may overlap in range with the second scan range 314. Thus, to achieve the same total scan angle 330, the individual coverages of the first and/or second scan angle 312, 314 can be reduced without changing the total scan angle 330.

Figure 4A:
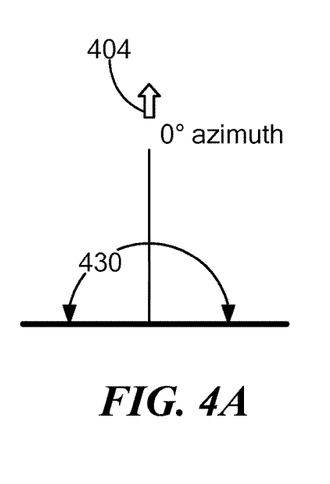
FIG. 4A shows an illustrative total scan angle range of a system of the type described above in conjunction with FIGS. 1-4.

FIG. 4A shows an illustrative total scan range of a system of the type described above in conjunction with FIGS. 1-4.

FIG. 4B shows an illustrative total scan volume which may be provided by a system of the type described above in conjunction with FIGS. 1-4. Region 432 is provided by transmit and receive signals at the first frequency and region 434 is provided by transmit and receive signals at the second frequency.

As described above, a spacing between the plurality of array elements can be selected based on the at least one of the first scan angle or the second scan angle. In an embodiment, each of the array elements can be spaced apart by a predetermined distance, whereby the spacing that is selected based at least in part upon one or more desired operational frequencies and/or scan angles. The selection of the spacing can be an iterative process involving trade-offs between the operational frequencies and/or scan angles.

For example, a particular application of an ESA may have a frequency requirement. The first frequency can be selected such that it matches the frequency requirement and be used to determine a first scan angle of the ESA and the first scan angle can be used to determine the spacing between each of the array elements (see equation above with respect to FIG. 3). The first frequency and the first scan angle can be used to determine the second frequency and the second scan angle.

In some embodiments, a particular application of an ESA may have a scan angle requirement. The first scan angle can be selected such that it matches the scan angle requirement. The first scan angle can be used to determine the first frequency. The first frequency and the first scan angle can be used to determine the second frequency and the second scan angle. In other embodiments, a particular application of an ESA may have a total scan angle requirement and each of the first and second scan angles and the first and second frequencies can be determined based at least in part on the total scan angle requirement.

It should be appreciated that the properties of an ESA (e.g., operating frequencies, spacing of array elements, boresight angles, scan angles, and total scan angle) can be selected and scaled accordingly for a particular application of an ESA. Further, each one of operating frequencies, spacing of array elements, boresight angles, scan angles, and total scan angle can be selected and determined based in part on one or a combination of the other properties of ESA. Thus, the final spacing can be selected based at least in part on trade-offs between one or more of these properties of the ESA and/or requirements of a particular application of an ESA.

In some embodiments, the properties of an ESA can be modified after initial selection to further optimize the respective ESA. For example, first and/or second scan angle may be modified if the first and second scan angles overlap. The first scan angle or second scan angle can be reduced to avoid any overlap by setting a scan limit of at least one of the first or second scan angle to match a scan limit of the other of the first or second scan angle. For example, defining antenna boresight as 0°, a first scan range may be ±63° and a second scan range may be from 90° to 36° relative to the antenna boresight. Thus, the first and second scan range overlap from 36° to 63°. The first scan range may be reduced from ±63° to ±36°, with 36° corresponding to at least one scan limit of the second scan range. As a result of reducing the first scan range from ±63° to ±36°, the spacing between each of the antenna elements in an ESA can be modified (here, increased) using the equation described above in conjunction with FIG. 3. In view of the above, it should be appreciated that element spacing may selected, at least in part, based upon the first scan range, the second scan range, or both the first and second scan ranges.

It should also be appreciated that a reduction in either or both of the first or second scan angle ranges allows a modification of the spacing of the antenna elements. For example, having reduced the first scan angle from ±63° to ±36°, the spacing between each of the antenna elements in an ESA can be increased using the equation described above in conjunction with FIG. 3. Thus, the spacing between each of the array elements can be increased and still provide the same total scan angle. Furthermore, since the element spacing is increased, for a given aperture size, the total number of array elements in a respective ESA can be reduced.

Thus, in some applications, it may be desirable to provide an ESA having increased spacing between each of the antenna elements so as to reduce the total number of antenna elements used in the ESA. With this approach, a radar system may include an ESA having a reduced number of antenna elements (and thus reduced cost, size and weight) without any reduction in the overall scan range of the radar system.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

What is claimed:

1. A radar system comprising:
   an active electronically scanned array (AESA) comprising a plurality of antenna elements, said AESA configured to transmit and receive radio frequency (RF) signals at a first frequency and a second, different frequency, the AESA having a first effective aperture and a first scan angle range at the first frequency and a second effective aperture and a second scan angle range at the second frequency and wherein the second effective aperture is angled with respect to the first effective aperture by an amount that allows wavelengths of the RF signals transmitted or received at the second effective aperture, as compared to the first effective aperture, to be in even multiples;

a receiver coupled to receive signals from said AESA and configured to receive signals at the first and second frequencies; and a transmitter coupled to provide signals to said AESA and configured to provide transmit signals to said AESA at the first and second frequencies.

2. The radar system of claim 1, wherein the first scan angle range combined with the second scan angle range provide a total scan angle range of the radar system.

3. The radar system of claim 2, wherein the first scan angle range and the second scan angle range are contiguous.

4. The radar system of claim 3, wherein the first scan angle range is greater than the second scan angle range.

5. The radar system of claim 3, wherein the first scan angle range is less than the second scan angle range.

6. The radar system of claim 2, wherein a difference between a first boresight angle at the first frequency and a second boresight angle at the second frequency corresponds to a scan limit of at least one of the first and second scan angle ranges.

7. The radar system of claim 1, wherein the AESA antenna elements are spaced by an amount corresponding to at least one of the first scan angle or the second scan angle.

8. The radar system of claim 1, further comprising a plurality of transmit/receive modules with each of the transmit/receive modules having an antenna port coupled to a corresponding one of said plurality of antenna elements and each of the transmit/receive modules having a transmitter/receiver port coupled to at least one or said transmitter and receiver.

9. The radar system of claim 1, wherein said plurality of antenna elements are spaced by an amount computed as:

$$\text{Spacing} = \frac{1}{(1+\sin(\varphi))}$$

where $\varphi$ represents an angle which defines a limit of the first scan range.

10. The radar system of claim 1, wherein said plurality of antenna elements are spaced by an amount computed as:

$$\text{Spacing} = \frac{1}{(1+\sin(\varphi))}$$

where $\varphi$ represents an angle which defines a limit of the second scan range.

11. A method of operating a radar system comprising:
(a) transmitting a first radio frequency (RF) signal at a first frequency over a first scan range from an aperture of an electronically scanned array (ESA);
(b) transmitting a second radio frequency (RF) signal at a second, different frequency over a second, different scan range from the same aperture of the ESA wherein the frequency of the second RF signal is determined by a spacing between antenna elements of the ESA;
(c) receiving, at the aperture of the ESA, RF signals at the first frequency within the first scan range;
(d) receiving, at the aperture of the ESA, RF signals at the second frequency within the second scan range.

12. The method of claim 11, wherein the antenna elements of the ESA are spaced by an amount substantially corresponding one-half wavelength at the first frequency.

13. The method of claim 11, wherein said plurality of antenna elements are spaced by an amount computed as:

$$\text{Spacing} = \frac{1}{(1+\sin(\varphi))}$$

where $\varphi$ represents an angle which defines a limit of the first scan range.

14. The method of claim 11, wherein said plurality of antenna elements are spaced by an amount computed as:

$$\text{Spacing} = \frac{1}{(1+\sin(\varphi))}$$

where $\varphi$ represents an angle which defines a limit of the second scan range.

15. The method of claim 11, further comprising transmitting RF signals over a frequency range which includes the first frequency and the second frequency.

16. The method of claim 11, further comprising receiving RF signals over a frequency range which includes the first frequency and the second frequency.

17. The method of claim 11, further comprising selecting a spacing between the plurality of antenna elements based upon at least one of the first and second scan angles.

18. The method of claim 11, further comprising selecting a number of antenna elements based upon at least one of the first scan range or the second scan range.

19. The method of claim 11, further comprising modifying at least one of the first scan range or the second scan range based upon a total scan angle.

20. The method of claim 11, further comprising modifying a spacing between each of the plurality of antenna elements in response to modifying the at least one of the first scan range or the second scan range.

* * * * *